United States Patent
Cunningham et al.

(10) Patent No.: US 11,017,466 B1
(45) Date of Patent: May 25, 2021

(54) SYSTEMS AND METHODS FOR DETERMINING A GRAPHICAL USER INTERFACE FOR GOAL DEVELOPMENT

(71) Applicant: Capital One Services, LLC, McLean, VA (US)

(72) Inventors: Sarah J. Cunningham, Arlington, VA (US); Christopher R. Carter, McLean, VA (US); Mykhaylo Bulgakov, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/793,800

(22) Filed: Feb. 18, 2020

(51) Int. Cl.
| | |
|---|---|
| *G06Q 40/02* | (2012.01) |
| *G06Q 20/10* | (2012.01) |
| *G06N 20/00* | (2019.01) |
| *G09B 19/18* | (2006.01) |

(52) U.S. Cl.
CPC .......... *G06Q 40/02* (2013.01); *G06N 20/00* (2019.01); *G06Q 20/108* (2013.01); *G09B 19/18* (2013.01)

(58) Field of Classification Search
CPC .... G06Q 40/00; G06Q 10/10; G06Q 10/0639; G06Q 40/06; G06Q 10/06393; G06Q 10/067; G06Q 10/06; G06Q 10/063; G06Q 30/0201; G06Q 40/02; G06Q 20/108; G06F 3/048; G06N 20/00; G09B 19/18

See application file for complete search history.

(56) References Cited

U.S. PATENT DOCUMENTS

| | | | | |
|---|---|---|---|---|
| 9,026,922 B2 * | 5/2015 | Dhaliwal | ............... | G06Q 50/01 |
| | | | | 715/753 |
| 9,529,841 B1 * | 12/2016 | Girdwood | ............. | G06F 40/106 |
| 2006/0074788 A1 * | 4/2006 | Grizack | ................. | G06Q 40/02 |
| | | | | 705/35 |
| 2014/0067634 A1 * | 3/2014 | Sowder | .................. | G06Q 40/06 |
| | | | | 705/35 |

* cited by examiner

*Primary Examiner* — Scott C Anderson
*Assistant Examiner* — Marla Hudson
(74) *Attorney, Agent, or Firm* — Bookoff McAndrews, PLLC

(57) ABSTRACT

A computer-implemented method for graphical user interface goal vision development may include receiving, via one or more processors, a first user financial goal of a user from a user device associated with the user; obtaining, via the one or more processors, at least one first user digital image; associating, via the one or more processors, the first user financial goal and the at least one first user digital image; obtaining, via the one or more processors, first user specific data relevant to the first user financial goal; transmitting, via the one or more processors, a digital visualization board indicative of the associated first user financial goal and the at least one first user digital image to the user device; determining, via the one or more processors, activity associated with the first user financial goal based on the first user specific data, by processing data including the obtained first user specific data using a trained machine learning model; and transmitting, via the one or more processors, a notification to the user device, wherein the notification is indicative of a suggested plan to achieve the first user financial goal, and wherein the notification is based on the determined activity and the first user financial goal.

20 Claims, 5 Drawing Sheets

SYSTEMS AND METHODS FOR DETERMINING A GRAPHICAL USER INTERFACE FOR GOAL DEVELOPMENT

TECHNICAL FIELD

Various embodiments of the present disclosure relate generally to determining graphical user interfaces for goal vision development.

BACKGROUND

Consumers utilizing an account for a specific goal may desire the ability to gather and process their personal information to generate suggested plans to help them reach their goal. A consumer's personal information may be found in various third-party systems. However, consumers may have difficulty assessing what information and third-party data is pertinent to their specific goal, for example, financial goal, since personal financial data is constantly changing and affected by various circumstances. Consumers may also desire the ability to connect their financial goal with a specific image and/or object and to allow friends and/or family to contribute to their financial goal.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods, systems, and non-transitory computer-readable media are disclosed for developing graphical user interfaces for goal vision development. Each of the examples disclosed herein may include one or more of the features described in connection with any of the other disclosed examples.

In one embodiment, a computer-implemented method for determining a graphical user interface for goal vision development may include receiving, via one or more processors, a first user financial goal of a user from a user device associated with the user; obtaining, via the one or more processors, at least one first user digital image; associating, via the one or more processors, the first user financial goal and the at least one first user digital image; obtaining, via the one or more processors, first user specific data relevant to the first user financial goal; transmitting, via the one or more processors, a digital visualization board indicative of the associated first user financial goal and the at least one first user digital image to the user device; determining, via the one or more processors, activity associated with the first user financial goal based on the first user specific data, by processing data including the obtained first user specific data using a trained machine learning model; and transmitting, via the one or more processors, a notification to the user device, wherein the notification is indicative of a suggested plan to achieve the first user financial goal, and wherein the notification is based on the determined activity and the first user financial goal.

In another embodiment, a computer system for determining a graphical user interface for goal vision development may include a memory storing instructions; and one or more processors configured to execute the instructions to perform operations including: receiving, via the one or more processors, a first user financial goal of a user from a user device associated with the user; obtaining, via the one or more processors, at least one first user digital image; associating, via the one or more processors, the first user financial goal and the at least one first user digital image; obtaining, via the one or more processors, first user specific data relevant to the first user financial goal; transmitting, via the one or more processors, a digital visualization board indicative of the associated first user financial goal and the at least one first user digital image to the user device; retrieving, via the one or more processors, transactional data of the user relevant to the first user financial goal; determining, via the one or more processors, activity associated with the first user financial goal, by processing data including the obtained first user specific data and the retrieved transactional data using a trained machine learning model; and transmitting, via the one or more processors, a notification to the user device, wherein the notification is indicative of a suggested plan to achieve the first user financial goal, wherein the notification is based on the determined activity and the first user financial goal.

In another example, a computer-implemented method for determining a graphical user interface for goal vision development may include receiving, via one or more processors, a first user financial goal of a user from a user device associated with the user; obtaining, via the one or more processors, at least one first user digital image; associating, via the one or more processors, the first user financial goal and the at least one first user digital image; obtaining, via the one or more processors, first user specific data relevant to the first user financial goal, wherein the first user specific data includes at least one of a user-specified duration of time, a user-specified number of transactions, or a user-specified monetary amount; transmitting, via the one or more processors, a digital visualization board indicative of the associated first user financial goal and the at least one first user digital image to the user device; determining, via the one or more processors, activity associated with the first user financial goal based on the first user specific data, by processing data including the obtained first user specific data using a trained machine learning model; transmitting, via the one or more processors, a notification to the user device, wherein the notification is indicative of a suggested plan to achieve the first user financial goal, and wherein the notification is based on the determined activity and the first user financial goal; determining, via the one or more processors, a status of the first user financial goal; and transmitting, via the one or more processors, a second notification to the first user device, wherein the second notification is based on the status of the first user financial goal.

According to additional aspects of the disclosure, a non-transitory computer-readable medium stores instructions that, when executed by one or more processors, cause the one or more processors to perform the aforementioned computer-implemented method or the operations that the aforementioned computer systems are configured to perform.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, in various embodiments, data such as first user specific data, transactional data, or financial data, may be used to determine activity associated with the first user financial goal. This determination of activity may be used to generate one or more notifications and/or suggested plans based on the determined activity and the first user financial goal, relative to the first user specific data, transactional data, or financial data.

Figure 1:
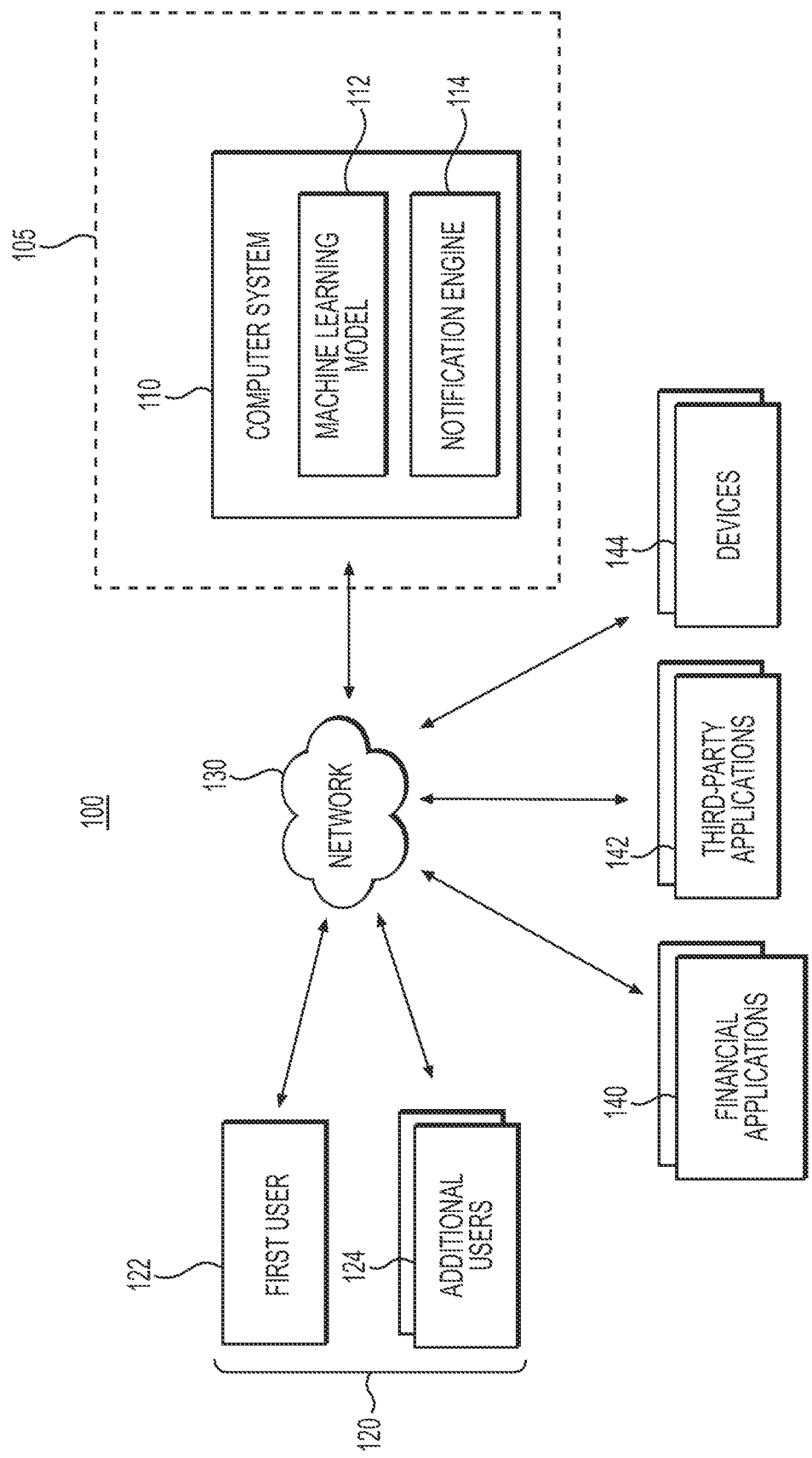
FIG. 1 depicts an exemplary system infrastructure, according to one or more embodiments.

FIG. 1 is a diagram depicting an example of a system environment 100 according to one or more embodiments of the present disclosure. The system environment 100 may include a computer system 110, one or more users 120, financial application(s) 140, third party application(s) 142, and device(s) 144. These components may be connected to one another by a network 130.

The computer system 110 may have one or more processors configured to perform methods described in this disclosure. User 122 may be referred to as a "first user," which is used to refer to a user whose financial goal may be received and who may then receive a notification as evaluated by the computer system 110. The computer system 110 may include a machine learning model 112 and a notification engine 114, which may each be software components stored in the computer system 110. The computer system 110 may be configured to utilize the machine learning model 112 and/or notification engine 114 when performing various methods described in this disclosure. Machine learning model 112 may be a plurality of machine learning models.

In some examples, the computer system 110 may have a cloud computing platform with scalable resources for computation and/or data storage, and may run one or more applications on the cloud computing platform to perform various computer-implemented methods described in this disclosure.

Computer system 110 may be configured to receive data from other components (e.g., users 120, financial applications 140, third party applications 142, and/or devices 144) of the system environment 100 via network 130. Computer system 110 may further be configured to utilize the received data by inputting the received data into the machine learning model 112 to produce a result. Information indicating the result may be transmitted to first user 122 over the network 130. In some examples, the computer system 110 may be referred to as a server system that provides a service including providing the information indicating the result to first user 122. Additionally, a computing device of the first user 122 may operate a client program, also referred to as a user application, used to communicate with the computer system 110. This user application may be used to provide information to the computer system 110 and to receive information from the computer system 110. In some examples, the user application may be a mobile application that is run on a mobile device (e.g., device 144) operated by first user 122. The user application may be an app, desktop application, website, cloud service, etc.

Users 120 may wish to determine financial goal vision development. In this disclosure, first user 122 may have a different or similar financial goal than additional users 124. Additional users 124 may desire to provide assistance to first user 122, for example, in the form of monetary funds.

Network 130 may be any suitable electronic network or combination of networks and may support any appropriate protocol suitable for communication of data to and from the computer system 110 and between various other components in the system environment 100. Network 130 may include a public network (e.g., the internet), a private network (e.g., a network within an organization), or a combination of public and/or private networks.

Financial applications 140, also referred to as "financial institutions" or "financial transaction applications," provide users with the ability to store, collect, and save money, wherein the applications may have the ability to accept and/or withdraw funds, for example, from a bank account. Therefore, financial applications 140 may collect and store transactional data pertaining to user transactions.

The users 120 and financial applications 140 may each include one or more computer systems configured to gather, process, transmit, and/or receive data. In general, whenever any of the users 120 and financial applications 140 are described as performing an operation of gathering, processing, transmitting, or receiving data, it is understood that such operation may be performed by a computer system thereof. In general, a computer system may include one or more computing devices, as described in connection with FIG. 5, below.

Third-party applications 142 may include other computer systems, such as web servers, that are accessible by computer system 110. Such resources may provide information, such as transactional data of the first user or financial data of the first user.

Devices 144 may each be a computer system. Examples of devices 144 may include computers, smartphones, wearable computing devices, or tablet computers. Devices 144 may be capable of transmitting information, for example, digital images, first user specific data, and first user financial goal. For example, devices 144 may have an application configured to transmit data indicating a first user financial goal to computer system 110.

Although financial applications 140, third-party applications 142, devices 144, machine learning model 112, notification engine 114, etc., of FIG. 1 are depicted as separate entities installed on different computing devices, this implementation is exemplary. Techniques discussed herein may be executed on a single device, or on any number of devices, with these techniques being performed in any combination on the any number of devices.

Computer system 110 may be part of entity 105, which may be any type of company, organization, or institution. In some examples, the entity 105 may be a financial services provider. In such examples, the computer system 110 may have access to data pertaining to user transactions through a private network within the entity 105. For example if the entity 105 is a card issuer, entity 105 may collect and store transactions involving a credit card or debit card issued by the entity 105. In such examples, the computer system 110 may still receive transactional data from other financial applications 140.

Figure 2:
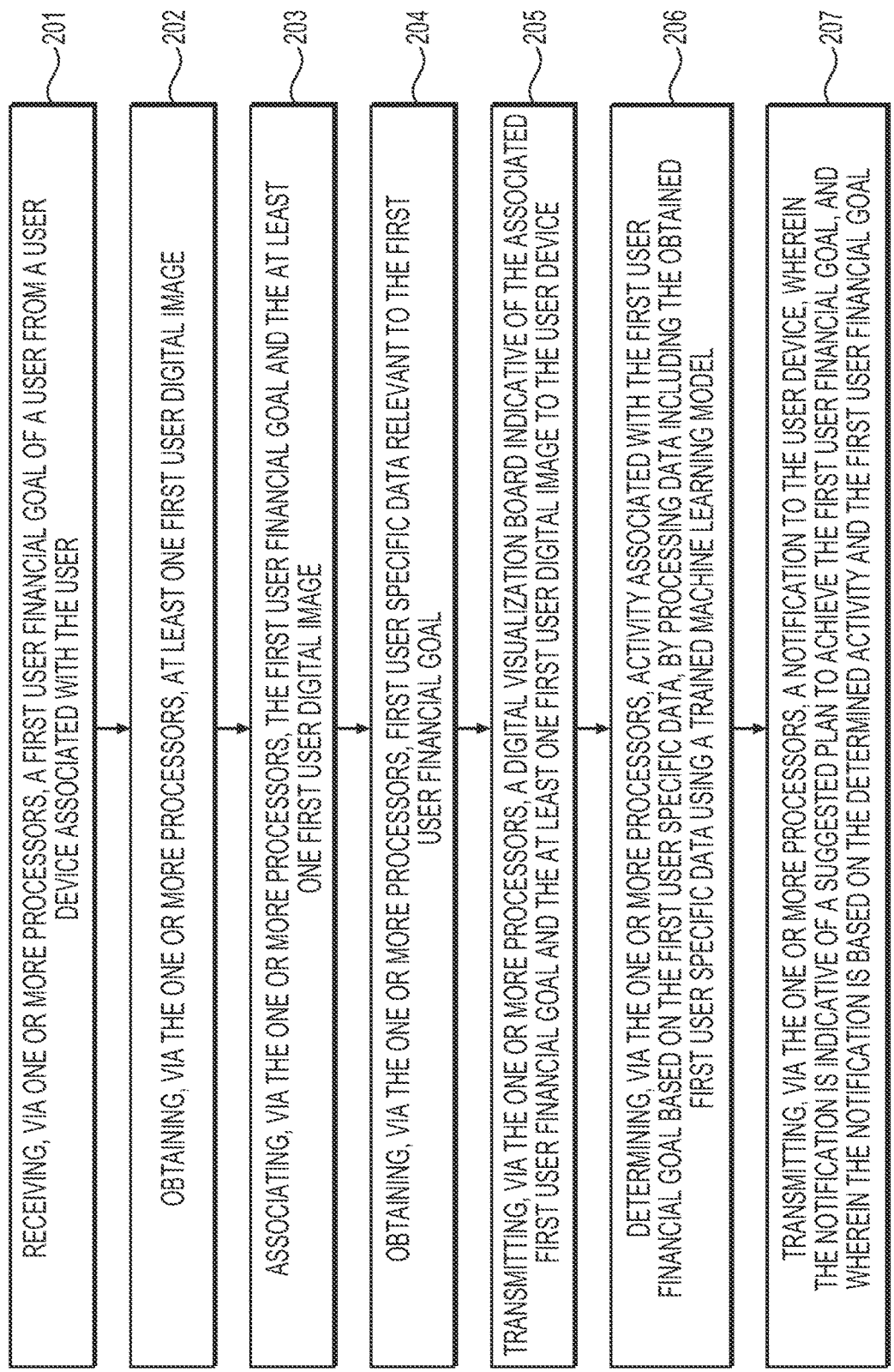
FIG. 2 depicts a flowchart of an exemplary method for goal vision development, according to one or more embodiments.

FIG. 2 is a flowchart illustrating a method for financial goal vision development, according to one or more embodiments of the present disclosure. The method may be performed by computer system 110. For purposes of illustration, user 122 is used as an example of the first user, and entity 105, operating the computer system 110, is assumed to be a financial services provider.

Step 201 may include receiving, via one or more processors, a first user financial goal of a user from a user device associated with the user. The first user financial goal may be, for example, a monetary amount that the user may want to save and/or a specific item (e.g., a vacation or a car) that the user may want to save for. The first user financial goal may be inputted into the user device associated with the user.

Step 202 may include obtaining, via the one or more processors, at least one first user digital image. The digital image may include, for example, at least one image, wherein the image may be obtained from the internet, third-party applications, the first user, or additional users. Such digital image may be communicated to computer system 110 using, for example, a device of the first user. Step 202 may further include associating, via the one or more processors, a product with the digital visualization board, wherein the product is related to the first user financial goal.

Step 203 may include associating, via the one or more processors, the first user financial goal and the at least one first user digital image. The first user digital image may represent or relate to the first user financial goal. For example, if the first user financial goal is directed to saving money for a vehicle, the digital image may be a car.

Step 204 may include obtaining, via the one or more processors, first user specific data relevant to the first user financial goal. Obtaining the first user specific data may include obtaining at least one of a user-specified duration of time, a user-specified number of transactions, or a user-specified monetary amount. For example, a user-specified duration of time may be a span of time first user has to reach the first user financial goal; a user-specified number of transactions may be an amount of times the first user 122 may want to save money to reach the first user financial goal, for example, the amount of times in a month or in a year first user 122 wants to put money into a savings account; or a user-specified monetary amount may be how much money the first user 122 wants to save in each transaction.

Step 205 may include transmitting, via the one or more processors, a digital visualization board indicative of the associated first user financial goal and the at least one first user digital image to the user device. The digital visualization board may include various information and/or images that may have been received in step 201 or obtained in step 202 or 204.

Step 206 may include determining, via the one or more processors, activity associated with the first user financial goal based on the first user specific data, by processing data including the obtained first user specific data using a trained machine learning model. Determining the activity associated with the first user financial goal includes processing data collected from a third-party application. The data collected from the third-party application may include transactional data of the first user or financial data of the first user. This data may also be inputted into machine learning model 112.

The machine learning model 112 may be a regression-based model that accepts the data obtained in step 204 as input data. The machine learning model 112 may be of any suitable form, and may include, for example, a neural network or deep neural network. The machine learning model 112 may compute the activity as a function of the user-specified duration of time, user-specified number of transactions, or user-specified monetary amount, and one or more variables indicated in the input data. This function may be learned by training the machine learning model 112 with training sets.

The machine learning model 112 may be trained (prior to its usage in step 204) by supervised, unsupervised, or semi-supervised learning, using training sets comprising data of types similar to the type of data used as the model input. For example, the training set used to train the model 112 may include any combination of the following: data relevant to the first user financial goal; first user specific data; transactional data of the first user 122 collected from third-party applications; financial data of the first user 122 collected from third-party applications; and/or data indicating other first user 122 activity.

Accordingly, the machine learning model 112 may be trained to map input variables to the first user specific data. That is, the machine learning model 112 may be trained to determine a duration of time or a suggested number of transactions as a function of various input variables. Such input variables may describe a user-specified duration of time (e.g., span of time first user has to reach the first user financial goal), a user-specified number of transactions (e.g., amount of times the first user 122 may want to save money to reach the first user financial goal, for example, amount of times in a month or in a year), or a user-specified monetary amount (e.g., how much money the first user 122 wants to save in each transaction).

Step 207 may include transmitting, via the one or more processors, a notification to the user device, wherein the notification is indicative of a suggested plan to achieve the first user financial goal, and wherein the notification is based on the determined activity and the first user financial goal. The suggested plan may identify at least one of a suggested duration of time or a suggested number of transactions to reach the first user financial goal.

In other examples, the method for financial goal vision development may include identifying, via the one or more processors, one or more additional users having at least one characteristic in common with the first user. The characteristics may be, for example, a user financial goal or a user digital image, wherein the user financial goal is related to the first user financial goal and the user digital image is related to the first user digital image. In these examples, the trained machine learning model may be a first trained machine learning model and the method may include determining a pattern of financial data of the one or more additional users via a second trained machine learning model. The suggested plan in step 207 may then be based on the determined activity associated with the first user, the first user specific data, and the pattern of financial data of the one or more additional users.

In other examples, the method of financial goal vision development may include determining, via the one or more processors, a status of the first user financial goal, and sending to the first user device, via the one or more processors, a notification based on the status of the first user financial goal. The status of the first user financial goal may be indicative of at least one or a combination of: (a) how much money has been saved, relative to the first user financial goal; (b) how much money needs to be saved to reach the first user financial goal; or (c) the duration of time required to reach the first user financial goal.

Any of the aforementioned data pertaining to first user 122 or other users 124 may be anonymized, such that the information transmitted to the first user 122 is not associable with personal identities. Additionally, the computer system 110 may be configured to perform the method of FIG. 2 only when the input data is of the extent that anonymity of the first user 122 or other users 124 may be protected. Additionally, step 206 may be repeated for a plurality of periods of time within the duration that the first user is attempting to achieve the first user financial goal.

Figure 3:
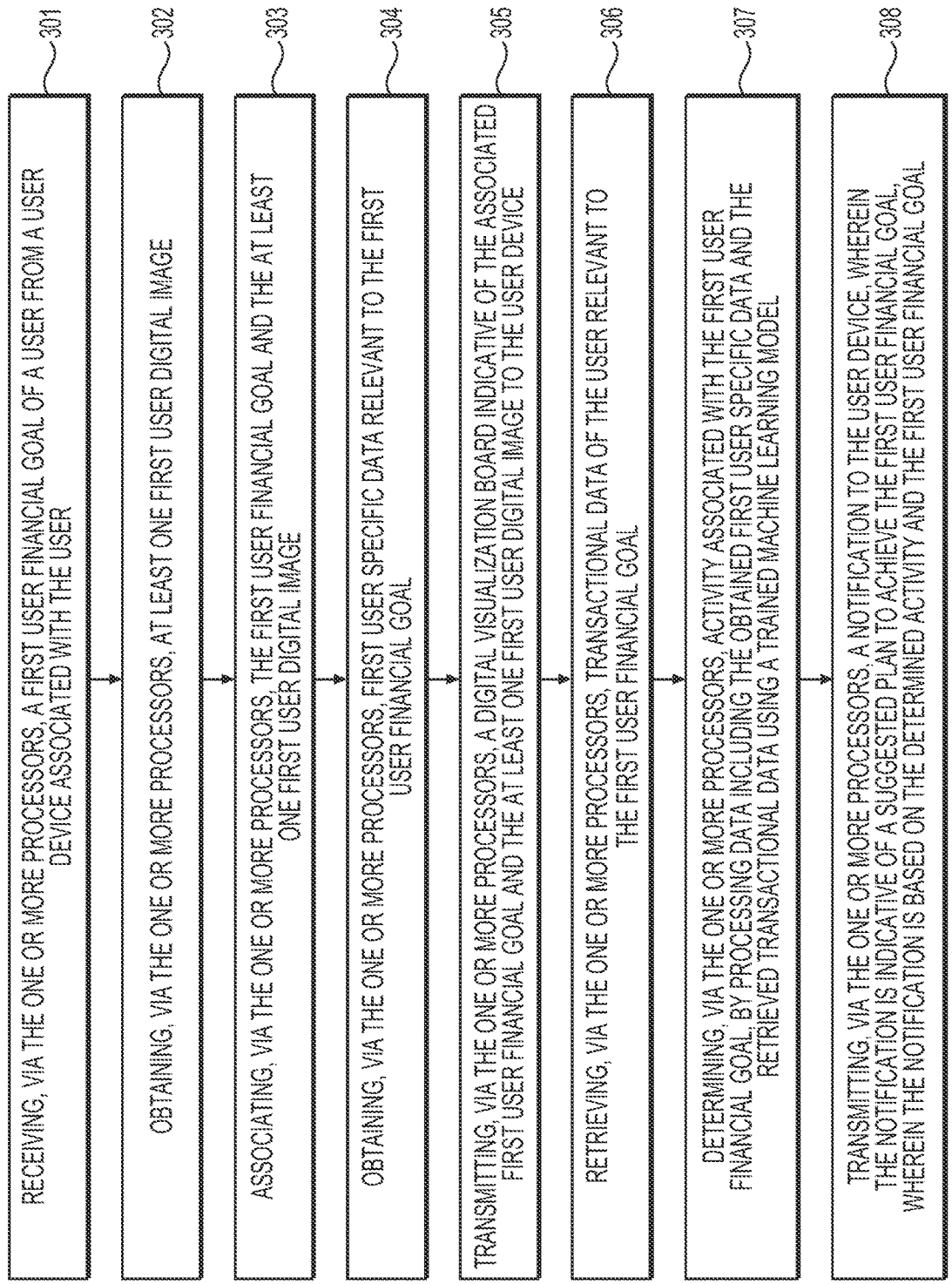
FIG. 3 depicts a flowchart of an exemplary method for goal vision development, according to one or more embodiments.

FIG. 3 is a flowchart illustrating a method for financial goal vision development. The method may include receiving, via the one or more processors, a first user financial goal of a user from a user device associated with the user (step 301); obtaining, via the one or more processors, at least one first user digital image (step 302); associating, via the one or more processors, the first user financial goal and the at least one first user digital image (step 303); obtaining, via the one or more processors, first user specific data relevant to the first user financial goal (step 304); transmitting, via the one or more processors, a digital visualization board indicative of the associated first user financial goal and the at least one first user digital image to the user device (step 305); retrieving, via the one or more processors, transactional data of the first user relevant to the first user financial goal (step 306); determining, via the one or more processors, activity associated with the first user financial goal, by processing data including the obtained first user specific data and the retrieved transactional data using a trained machine learning model (step 307); and transmitting, via the one or more processors, a notification to the user device, wherein the notification is indicative of a suggested plan to achieve the first user financial goal, wherein the notification is based on the determined activity and the first user financial goal (step 308). Steps 301, 302, 303, 304, 305, 307, and 308 may respectively correspond to steps 201, 202, 203, 204, 205, 206, and 207 of FIG. 2, and may include any of the features discussed for steps 201, 202, 203, 204, 205, 206, and 207, above.

In step 306, transactional data of the first user relevant to the first user financial goal may be retrieved from institutions or financial transaction applications. Transactional data of the first user relevant to the first user financial goal may include transactional details, such as the amount of a transaction and the timestamp of the transaction, so as to permit an assessment of the frequency and/or number of transactions during a certain period of time.

In other examples, the method for financial goal vision development may further include identifying, via the one or more processors, financing options related to the first user financial goal. Financing options that may be identified include, but are not limited to, loan options or credit card options. For example, if the first user financial goal is to save enough money for a car, possible auto loans and financing options the first user may be qualified for may be identified and provided to the first user.

In some examples, the method for financial goal vision development may further include identifying, via the one or more processors, travel options related to the first user financial goal. For example, if the first user financial goal is to save enough money for a trip to a desired location, possible travel routes, hotels, and/or uses of credit card points and/or miles may be identified and provided to the user.

In step 308, the suggested plan may identify at least one of a suggested duration of time, a suggested number of transactions, suggested financing options, or suggested travel options, as discussed above.

In other examples, the method for financial goal vision development may include identifying, via the one or more processors, one or more additional users having at least one characteristic in common with the first user. The characteristics may be, for example, a user financial goal or a user digital image, wherein the user financial goal is related to the first user financial goal and the user digital image is related to the first user digital image. In these examples, the trained machine learning model may be a first trained machine learning model, the method further including determining a pattern of financial data of the one or more additional users via a second trained machine learning model. The suggested plan in step 308 may then be based on the determined activity associated with the first user, the first user specific data, and the pattern of financial data of the one or more additional users.

In some examples, the method for financial goal vision development may further include determining, via the one or more processors, a status of the first user financial goal, and sending to the first user device, via the one or more processors, a notification based on the status of the first user financial goal. The status of the first user financial goal may be indicative of at least one or a combination of: (a) how much money has been saved, relative to the first user financial goal; (b) how much money needs to be saved to reach the first user financial goal; or (c) the duration of time required to reach the first user financial goal.

Figure 4:
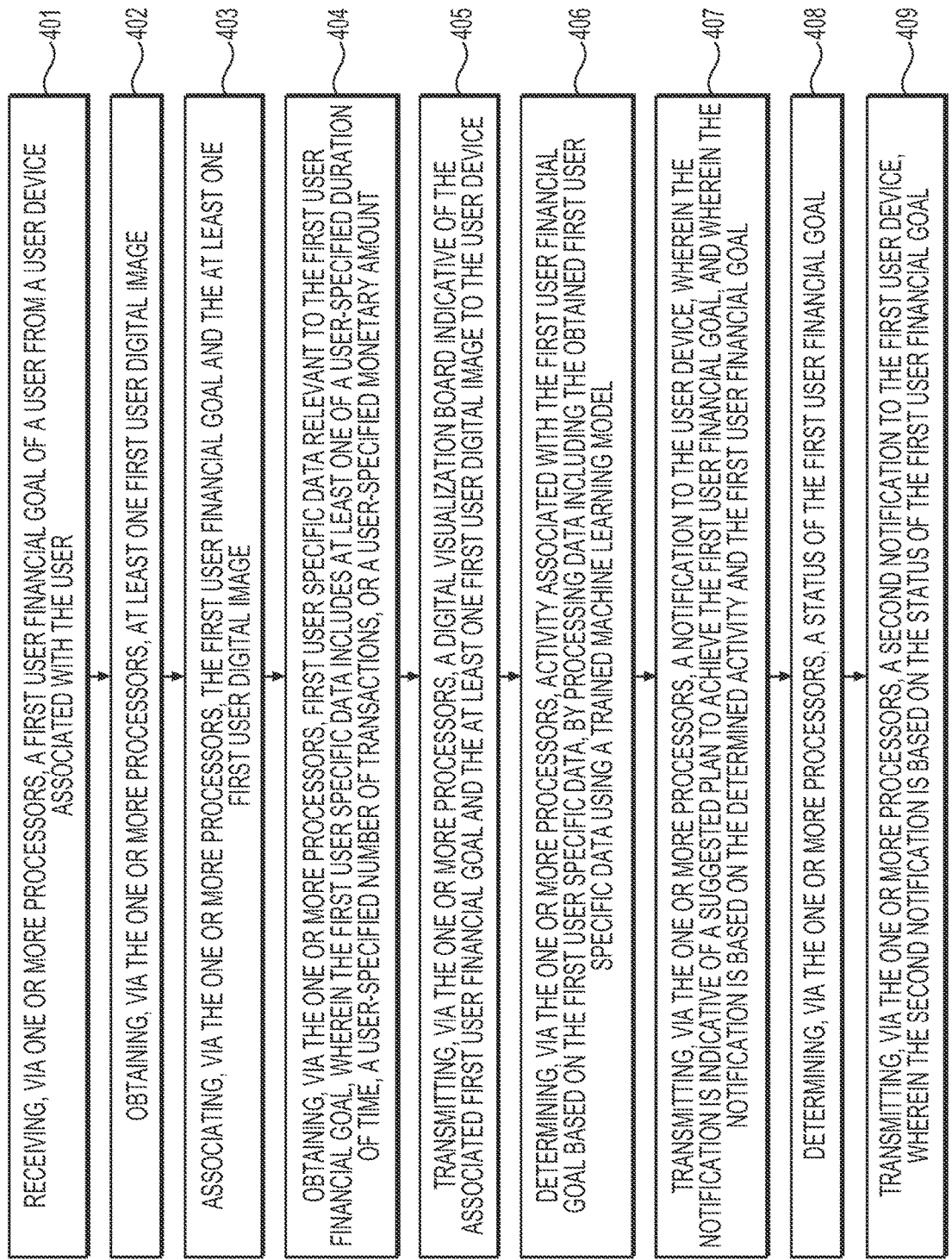
FIG. 4 depicts a flowchart of an exemplary method for goal vision development, according to one or more embodiments.

FIG. 4 is a flowchart illustrating a method for financial goal vision development. The method may include receiving, via one or more processors, a first user financial goal of a user from a user device associated with the user (step 401); obtaining, via the one or more processors, at least one first user digital image (step 402); associating, via the one or more processors, the first user financial goal and the at least one first user digital image (step 403); obtaining, via the one or more processors, first user specific data relevant to the first user financial goal, wherein the first user specific data includes at least one of a user-specified duration of time, a user-specified number of transactions, or a user-specified monetary amount (step 404); transmitting, via the one or more processors, a digital visualization board indicative of the associated first user financial goal and the at least one first user digital image to the user device (step 405); determining, via the one or more processors, activity associated with the first user financial goal based on the first user specific data, by processing data including the obtained first user specific data using a trained machine learning model (step 406); transmitting, via the one or more processors, a notification to the user device, wherein the notification is indicative of a suggested plan to achieve the first user financial goal, and wherein the notification is based on the determined activity and the first user financial goal (step 407); determining, via the one or more processors, a status of the first user financial goal (step 408); and transmitting, via the one or more processors, a second notification to the first user device, wherein the second notification is based on the status of the first user financial goal (step 409). Steps 401, 402, 403, 404, 405, 406, and 407 respectively correspond to steps 201, 202, 203, 204, 205, 206, and 207 of FIG. 2, and may include any of the features discussed for steps 201, 202, 203, 204, 205, 206, and 207, above.

In other examples, the method for financial goal vision development may include identifying, via the one or more processors, one or more additional users having at least one characteristic in common with the first user. The characteristics may be, for example, a user financial goal or a user digital image, wherein the user financial goal is related to the first user financial goal and the user digital image is related to the first user digital image. In these examples, the trained machine learning model may be a first trained machine learning model, the method further including determining a pattern of financial data of the one or more additional users via a second trained machine learning model. The suggested plan in step 407 may then be based on the determined activity associated with the first user, the first user specific data, and the pattern of financial data of the one or more additional users.

In general, any process discussed in this disclosure that is understood to be computer-implementable, such as the processes illustrated in FIGS. 2-4, may be performed by one or more processors of a computer system, such as computer system 110, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as computer system 110, may include one or more computing devices. If the one or more processors of the computer system 110 are implemented as a plurality of processors, the plurality of processors may be included in a single computing device or distributed among a plurality of computing devices. If a computer system 110 comprises a plurality of computing devices, the memory of the computer system 110 may include the respective memory of each computing device of the plurality of computing devices.

Figure 5:
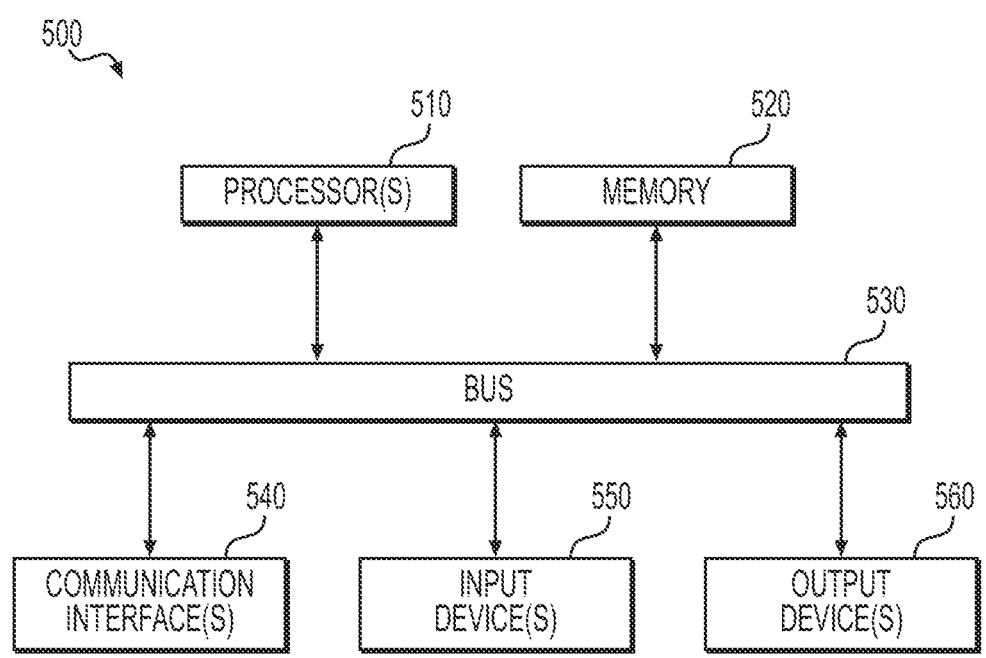
FIG. 5 depicts an example of a computing device, according to one or more embodiments.

FIG. 5 illustrates an example of a computing device 500 of a computer system, such as computer system 110. The computing device 500 may include processor(s) 510 (e.g., CPU, GPU, or other such processing unit(s)), a memory 520, and communication interface(s) 540 (e.g., a network interface) to communicate with other devices. Memory 520 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 520. The computing device 500 may, in some embodiments, further include input device(s) 550 (e.g., a keyboard, mouse, or touchscreen) and output device(s) 560 (e.g., a display, printer). The aforementioned elements of the computing device 500 may be connected to one another through a bus 530, which represents one or more buses. In some embodiments, the processor(s) 510 of the computing device 500 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for determining a graphical user interface for goal vision development, the method comprising:
   receiving, via one or more processors, a first user financial goal of a user from a user device associated with the user;
   obtaining, via the one or more processors, at least one first user digital image;
   associating, via the one or more processors, the first user financial goal and the at least one first user digital image;
   obtaining, via the one or more processors, first user specific data relevant to the first user financial goal;
   transmitting, via the one or more processors, a digital visualization board indicative of the associated first user financial goal and the at least one first user digital image to the user device;
   determining, via the one or more processors, activity associated with the first user financial goal based on the first user specific data, by processing data including the obtained first user specific data using a trained machine learning model;
   determining, via the one or more processors, a pattern of activity associated with a financial goal of one or more additional users that are related to the user based on the at least one first user digital image having at least one characteristic in common with the one or more additional users;
   training, via the one or more processors, the trained machine learning model using the financial goal of the one or more additional users and the pattern of activity associated with the financial goal of the one or more additional users;
   mapping variables for achieving the financial goal of the one or more additional users using the trained machine learning model;
   generating, via the trained machine learning model, a suggested plan to achieve the first user financial goal by mapping the first user specific data relative to the activity associated with the first user financial goal as a function of the variables for achieving the first user financial goal; and
   transmitting, via the one or more processors, a notification to the user device, wherein the notification is indicative of the suggested plan to achieve the first user financial goal, and wherein the notification is based on the determined activity, the pattern of activity associated with the financial goal of the one or more additional users, and the first user financial goal.

2. The method of claim 1, further including associating, via the one or more processors, a product with the digital visualization board, wherein the product is related to the first user financial goal.

3. The method of claim 1, wherein the obtaining the first user specific data includes obtaining at least one of a user-specified duration of time, a user-specified number of transactions, or a user-specified monetary amount.

4. The method of claim 1, wherein the determining the activity associated with the first user financial goal includes processing data collected from a third-party application.

5. The method of claim 4, wherein the data collected from the third-party application includes transactional data of the user or financial data of the user.

6. The method of claim 1, wherein the suggested plan identifies at least one of a suggested duration of time or a suggested number of transactions.

7. The method of claim 1, further including identifying, via the one or more processors, the one or more additional users having the at least one characteristic in common with the at least one first user digital image of the user.

8. The method of claim 7, wherein the at least one characteristic includes a user digital image, wherein a user financial goal of the one or more additional users is related to the first user financial goal based on the user digital image being related to the first user digital image.

9. The method of claim 7, wherein the trained machine learning model is a first trained machine learning model, the method further including determining a pattern of financial data of the one or more additional users via a second trained machine learning model.

10. The method of claim 9, wherein the suggested plan is based on the determined activity associated with the user, the first user specific data, and the pattern of financial data of the one or more additional users.

11. The method of claim 1, further including determining, via the one or more processors, a status of the first user financial goal, and sending to the first user device, via the one or more processors, a notification based on the status of the first user financial goal.

12. A computer system for determining a graphical user interface for goal vision development, comprising:
   a memory storing instructions; and
   one or more processors configured to execute the instructions to perform operations including:
      receiving, via the one or more processors, a first user financial goal of a user from a user device associated with the user;
      obtaining, via the one or more processors, at least one first user digital image;
      associating, via the one or more processors, the first user financial goal and the at least one first user digital image;
      obtaining, via the one or more processors, first user specific data relevant to the first user financial goal;
      transmitting, via the one or more processors, a digital visualization board indicative of the associated first user financial goal and the at least one first user digital image to the user device;
      retrieving, via the one or more processors, transactional data of the user relevant to the first user financial goal;
      determining, via the one or more processors, activity associated with the first user financial goal, by processing data including the obtained first user specific data and the retrieved transactional data using a trained machine learning model;
      determining, via the one or more processors, a pattern of activity associated with a financial goal of an additional user that is related to the user based on the at least one first user digital image having at least one characteristic in common with the one additional user;

training, via the one or more processors, the trained machine learning model using the financial goal of the additional user and the pattern of activity associated with the financial goal of the additional user;

mapping, using the trained machine learning model, one or more variables for achieving the financial goal of the additional user;

generating, via the trained machine learning model, a suggested plan to achieve the first user financial goal by mapping the first user specific data relative to the activity associated with the first user financial goal based on the one or more variables; and transmitting, via the one or more processors, a notification to the user device, wherein the notification is indicative of the suggested plan to achieve the first user financial goal, wherein the notification is based on the determined activity, the pattern of activity, and the first user financial goal.

13. The system of claim 12, wherein the operations further include operations for identifying, via the one or more processors, financing options related to the first user financial goal.

14. The system of claim 12, wherein the operations further include operations for identifying, via the one or more processors, travel options related to the first user financial goal.

15. The system of claim 12, wherein the transactional data is retrieved from financial institutions or financial transaction applications.

16. The system of claim 12, wherein the determining the activity associated with the first user financial goal includes processing data collected from a third party application.

17. The system of claim 12, wherein the suggested plan identifies at least one of a suggested duration of time, a suggested number of transactions, suggested financing options, or suggested travel options.

18. The system of claim 12, wherein the trained machine learning model is a first trained machine learning model, wherein the operations further include operations for determining a pattern of financial data of one or more additional users via a second trained machine learning model, wherein the pattern of financial data of the one or more additional users is related to the first user financial goal.

19. The system of claim 12, wherein the operations further include operations for determining, via the one or more processors, a status of the first user financial goal, and sending to the first user device, via the one or more processors, a notification based on the status of the first user financial goal.

20. A computer-implemented method for determining a graphical user interface for goal vision development, the method comprising:

receiving, via one or more processors, a first user financial goal of a user from a user device associated with the user;

obtaining, via the one or more processors, at least one first user digital image;

associating, via the one or more processors, the first user financial goal and the at least one first user digital image;

obtaining, via the one or more processors, first user specific data relevant to the first user financial goal, wherein the first user specific data includes at least one of a user-specified duration of time, a user-specified number of transactions, or a user-specified monetary amount;

transmitting, via the one or more processors, a digital visualization board indicative of the associated first user financial goal and the at least one first user digital image to the user device;

determining, via the one or more processors, activity associated with the first user financial goal based on the first user specific data, by processing data including the obtained first user specific data using a trained machine learning model;

determining, via the one or more processors, a pattern of activity associated with a financial goal of one or more additional users that are related to the user based on the at least one first user digital image having at least one characteristic in common with the one or more additional users;

training, via the one or more processors, the trained machine learning model using the financial goal and the pattern of activity of the one or more additional users;

mapping at least one variable for achieving the financial goal of the one or more additional users using the trained machine learning model;

generating, via the trained machine learning model, a suggested plan to achieve the first user financial goal by mapping the first user specific data relative to the activity associated with the first user financial goal as a function of the at least one variable;

transmitting, via the one or more processors, a notification to the user device, wherein the notification is indicative of the suggested plan to achieve the first user financial goal, and wherein the notification is based on the determined activity, the pattern of activity associated with the financial goal of the one or more additional users, and the first user financial goal;

determining, via the one or more processors, a status of the first user financial goal; and transmitting, via the one or more processors, a second notification to the first user device, wherein the second notification is based on the status of the first user financial goal.

* * * * *